United States Patent [19]

Claes

[11] Patent Number: 6,151,687
[45] Date of Patent: Nov. 21, 2000

[54] METHOD FOR OBSERVING THE EXECUTION OF A PROGRAM LOADED INTO AN INFORMATION PROCESSING SYSTEM AND APPARATUS FOR PERFORMING THE METHOD

[76] Inventor: Gerard Claes, 14, Rue des Pres, 91480 Quincy Sous Senart, France

[21] Appl. No.: 08/118,773

[22] Filed: Sep. 10, 1993

Related U.S. Application Data

[63] Continuation of application No. 07/545,960, Jul. 2, 1990, abandoned.

[30] Foreign Application Priority Data

Jul. 7, 1989 [FR] France ................................ 89.09158

[51] Int. Cl.$^7$ .................................................. G06F 11/34
[52] U.S. Cl. .................................. 714/39; 714/47
[58] Field of Search ..................... 395/575, 500; 364/264, 267, 267.2, 280.1, 275.5, 276; 714/39, 47

[56] References Cited

U.S. PATENT DOCUMENTS

| | | | |
|---|---|---|---|
| 4,205,370 | 5/1980 | Hirtle | 395/575 |
| 4,315,311 | 2/1982 | Causse et al. | 395/575 |
| 4,462,077 | 7/1984 | York | 395/650 |
| 4,503,495 | 3/1985 | Boudreau | 395/725 |
| 4,740,895 | 4/1988 | Sargent et al. | 395/575 |
| 4,813,009 | 3/1989 | Tallman | 395/500 |
| 4,879,646 | 11/1989 | Iwasaki et al. | 395/375 |
| 4,953,084 | 8/1990 | Meloy et al. | 395/575 |
| 5,067,107 | 11/1991 | Wade | 395/500 |
| 5,103,394 | 4/1992 | Blasciak | 395/575 |

FOREIGN PATENT DOCUMENTS 0084431 12/1983 European Pat. Off. .

OTHER PUBLICATIONS

AT&T "Unix System V" User's Reference Manual, 1987, pp. 218–222, 286–2867, Prentice–Hall, Inc., NJ.

IBM Technical Disclosure Bulletin, vol. 29, No. 7, Dec. 1986, pp. 3157–3158.

Wescon/87 Conference Record, vol. 31, 1987, 27/3, pp. 1–5 "Real–Time Multiprocessing Debugging", Bill Sundermeier.

Haban et al., "A Hybrid Monitor for Behavior and Performance Analysis of Distributed Systems", IEEE Transactions on Software Engineering, vol. 16 #2 pp. 197–211.

Sharma et al., "Run–Time Monitoring of Concurrent Programs on the Cedar Multiprocessor", IEEE pp. 784–793.

Dieter et al. "Monitoring & Performance Measuring Distributed Systems During Operation", ACM Sigmetrics 1988, pp. 197–206.

*Primary Examiner*—Dung C. Dinh
*Attorney, Agent, or Firm*—Miles & Stockbridge P.C.; Edward J. Kondracki

[57] ABSTRACT

A method and apparatus for observing the execution of an application program (APP) loaded into an information processing system, characterized in that by means of pickups (32), nonperturbing recording is performed, at predetermined points of the system, of instantaneous information units relating to the program being executed and/or its information processing operating context; optionally, the information units are memorized in accordance with a grid pre-established in a status table (TE) incorporated in an observation memory (MO); and access to the status table (TE) is authorized, particularly in the reading mode, for programs (SER) outside the observed program being executed.

26 Claims, 2 Drawing Sheets

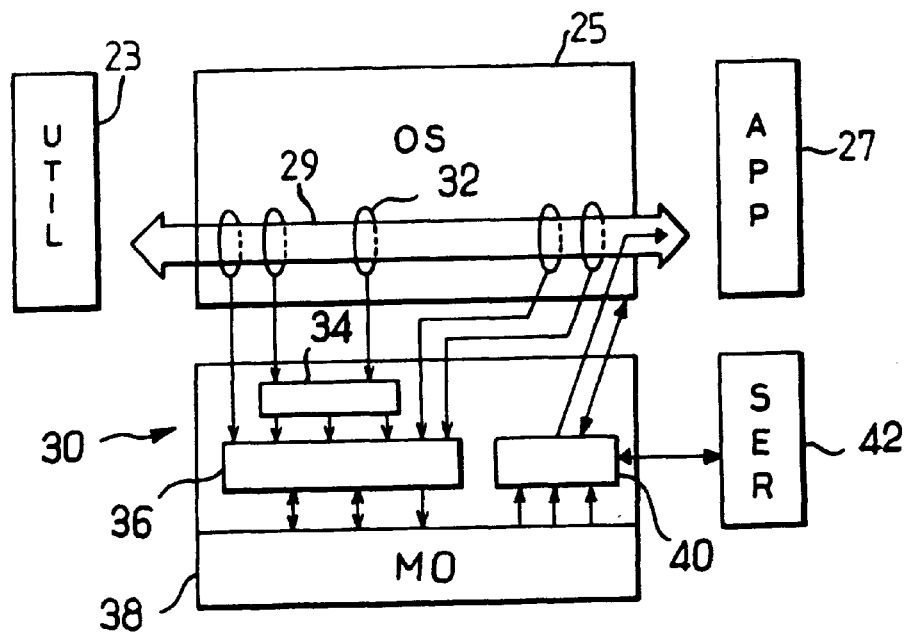
FIG_2
FIG_3
| | TE | | | TANT1 | | TANT2 | | | TANTN | |
|---|---|---|---|---|---|---|---|---|---|---|
| FO | ao | bo | co | a.1 | b.1 | a.2 | b.2 | | a.n | b.n |
| SC | - | - | - | - | - | - | - | | - | - |
| EN | io | jo | ko | i.1 | k.1 | i.2 | k.2 | | i.n | k.n |
| SO | - | - | - | - | - | - | - | | - | - |
| CH | ro | so | to | s.1 | t.1 | s.2 | t.2 | | s.n | t.n |
| SU | - | - | - | - | - | - | - | | - | - |

METHOD FOR OBSERVING THE EXECUTION OF A PROGRAM LOADED INTO AN INFORMATION PROCESSING SYSTEM AND APPARATUS FOR PERFORMING THE METHOD

This is a Continuation of application Ser. No. 07/545,960, filed Jul. 2, 1990 now abandoned.

IDENTIFICATION OF RELATED APPLICATION

This application relates to my copending application filed concurrently herewith, Ser. No. 07/545,959 (abandoned), entitled "Method of Assistance for the User of an Information Processing System and Apparatus for Performing the Method". The subject matter of said application is incorporated hereby by reference.

BACKGROUND OF THE INVENTION

The invention generally relates to tracking the execution of a program loaded into an information processing system, for instance defined by the following minimal configuration: one central processing unit, a central memory, one or more input and/or output peripherals, an operating system, and at the option of the user, one or more application programs.

For several years, the use of the information processing tool has gradually tended toward a convivial mode between the information processing system and its direct user. The convivial mode is used particularly for assisting non-professional users in real time. For example, numerous kinds of applications software have a "help" function that is activated by a reserved key of the keyboard. Nevertheless, until now, this assistance has remained quite limited and quite general (being in the form of a directory or a reminder), because of the lack of specific instantaneous information on the execution status of the program being run and on the context in which the program is being used. This situation is particularly problematic in applications where conviviality has a certain importance, in particular in self-training or in trouble-shooting during use.

SUMMARY OF THE INVENTION

To improve the tracking of the execution of a program loaded into an information processing system, the invention proposes a method of observation of the execution of this program, characterized in that at predetermined points of the system, recording is performed of instantaneous information units relating to the program being executed and/or its information processing operating contents. Optionally, certain of the information units are processed by pre-established analysis procedures. A selection of information units, processed and/or unprocessed, is memorized in accordance with a grid pre-established in a status table TE, and access to the status table TE is authorized, particularly in the reading mode, for SER programs external to the observed program being executed.

In a first embodiment of the method according to the invention, the status table TE is associated with a chronological benchmark with respect to the observed programs being executed, and the contents of the status table TE are maintained for a period of time equal at least to a predetermined duration known as the current observation cycle and all or part of the status table is updated automatically by successive recording operations upon each new observation cycle.

Advantageously, all or some of the status tables TE corresponding to observation cycles preceding the current cycle are retained in memory in accordance with a structure of previous chronologically arranged status tables TANT (TANT1–TANTN). Thus it is possible to have a plurality of other programs at one's disposal, such as service software, or a historical record of the execution in progress of the observed program. Moreover, this operation can be performed in a manner that is non-perturbing to the program observed. In the case of trouble, the recording operations performed prior to the problematic event enable diagnostics and easier resolution of the problem. In conventional information processing systems, the appearance of the problem-causing event quite often prevents later recording of the information necessary for the return of the system to its operational status.

In another embodiment of the invention, in this application program, a service zone operating in the reading and/or writing mode is organized on the basis of service programs SER that are outside the application observed, to permit the input and output of the information or instruction application program relating to the application program observed and/or its information processing operating context. This characteristic is quite important in the case where, particularly in the application program, it is opportune to send the system instructions for which the execution conditions are to be observed by the interface in order to enable performing diagnosis and then returning the system to the operational status.

In still another embodiment of the method according to the invention, the status table is structured on the basis of principal fields. Advantageously, the status table includes at least one principal field, selected from among the following fields:

function FO: defined by the list of the last functions executed by the program and functions being executed or planned to be executed, and their context;

central system SC: defined by the status of certain stacks, registers and memory zones of the central system;

input EN: defined by the last data received from the input peripherals with their context (for example, the error and/or validity tests);

output SO: defined by the last data output to the output peripherals with their context;

chrono CH: defined by the information and/or analyses involving the time function (execution speed, transfer speed, synchronicity, etc.);

carrier SU: defined by the information relating to the hardware and software carrier of the program observed, in particular the configuration of the information processing system.

This structure, with arrangement by a pre-established grid, is particularly important in terms of the ease of access for the service software. Despite the diversity of application software that can be observed, this structure also authorizes the use of standard processing via the service software of the system.

The invention also relates to an apparatus for performing various variants of the method according to the invention, in association with an information processing system having at least a central processing unit, a central memory, input and/or output peripherals, an operating system OS and at least one application program APP, the apparatus being characterized in that it further includes an observation interface having means forming pickups for instantaneous information; means for processing the instantaneous information; means for memorizing the instantaneous information, before or after processing; and means for reading the memorized information that are accessible from outside the application program being observed and executed. Advantageously, some of the means acting as pickups are associated with the central memory and/or with certain input and output peripherals, for example in the form of central memory readers and/or keyboard filters.

Moreover, in another embodiment of the invention, the observation interface includes means, which are accessible from outside the apparatus, for reading and/or writing in the observed application program.

BRIEF DESCRIPTION OF THE DRAWINGS

The invention will now be described with reference to the accompanying drawings, in which:

FIG. 2 is a basic diagram illustrating the basic observation method according to the invention; and FIG. 3 shows a diagram of the memory tables used for performing the method according to the invention.

DESCRIPTION OF THE PREFERRED EMBODIMENTS

Figure 1:
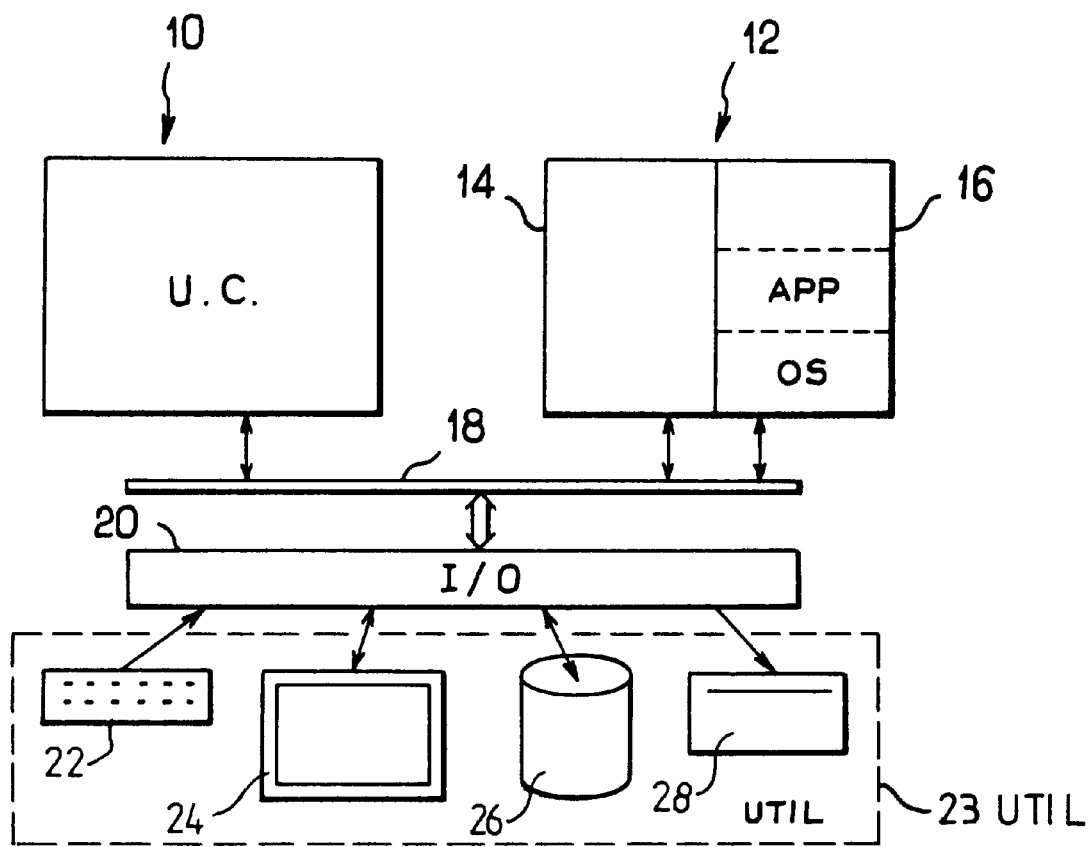
FIG. 1 shows a conventional information processing system, on which the method according to the invention can be performed.

The information system shown in FIG. 1, of conventional architecture and of the unitary type, includes a central processing unit U.C. 10 and a central memory 12, which in turn is divided into a read only memory (ROM) 14 and a random access memory (RAM) 16, suitably connected via an internal communication bus 18. The central subsystem 10, 12 of the information processing system communicates with a set of input and/or output peripherals UTIL which are accessible to the user of the system via an input/output unit I/O 20 connected to the bus 18. By way of non-limiting example, four types of peripherals have been shown to make up the UTIL, more specifically a keyboard 22 (input), a screen 24 (input/output), an auxiliary disk memory unit 26 (input/output) and a printer 28 (output). In an entirely conventional manner, management of the input and output peripherals is assured by means of a set of programs known as an operating system OS, suitably loaded into RAM 16 with the aid of initializing programs that are memory-resident in ROM 14. Also loaded into RAM are one or more application programs APP that can be executed either in the unitary mode or in the simultaneous mode depending on the characteristics of the system. In any case, the set of interactions INTER between the user, the peripherals UTIL and the application program APP is managed by the operating system OS.

FIG. 2 is the basic diagram illustrating the assistance method according to the invention.

In the upper portion of FIG. 2, three block diagrams UTIL 23, OS 25 and APP 27 are shown, as elements of the above-described information processing system. Furthermore, the set of interactions between the user, by way of the peripherals UTIL 23, and the application program APP 27 take place via the channel INTER (represented by the double arrow 29), which is an integral part of the operating system OS 25.

According to the invention, an observation interface 30 includes means acting as pickups 32 for instantaneous information units. These pickups 32, schematically shown in FIG. 2, are operatively associated with both the central memory 12 and the input and output peripherals UTIL of the system. They are present in particular in the form of programs and/or circuits capable of performing the functions of central memory reader, keyboard filter, screen memory reader, mouse reader, and buffer memory reader of the printer and/or modem.

Besides the pickups 32, the observation interface 30 includes means 34 for processing the instantaneous information, means for memorizing this instantaneous information before or after processing, comprising a monitor circuit 36 and an observation memory MO 38 of the RAM type, and a monitoring module 40 including means for access to the observation memory 38, in particular means for reading this memory, from other applications loaded into the system, in particular from the operating system 25 itself and from service programs SER 42, such as a self-training program for the user and a trouble-shooting program. As shown in FIG. 2, the monitoring module 40 communicates bidirectionally with the operating system 25 and the service programs SER 42. In particular, this module also includes writing means enabling it to send information and/or instructions directly to the application program 27.

The observation memory 38 is schematically shown in FIG. 3. It includes a status table TE representing the instantaneous status of the application being executed, in its information processing context, and previous status tables TANT (TANT1–TANTN), in which the information corresponding to certain captions are arranged chronologically to constitute a historical record. The status tables TE and TANT are structured in principal fields (for example, the function or FO field), which in turn are divided into captions (a, b, . . . , i, j, k, . . . ). The captions are marked with a zero for the table TE (such as ao, bo) or a suffix -i for the table TANTi (for example a-n, b-n for the table TANTN). In the example described here by way of non-limiting example, the following principal fields are used:

1. function (FO): defined by the list of the last functions executed by the program APP observed and functions being executed or planned to be executed, and their context (for example, the function parameters, the addresses for return to the program, the associated interruptions, etc.);
2. central system (SC): defined by the status of certain stacks, registers and memory zones of the central system (central processing unit and central memory);
3. input (EN): defined by the last data received from the input peripherals with their context (for example, the error and/or validity tests);
4. output (SO): defined by the last data output to the output peripherals, with their context;
5. chrono (CH): defined by the information and/or analyses involving the time function (execution speed, transfer speed, synchronicity, etc.);
6. carrier (SU): defined by the information relating to the context of information processing operation of the program APP observed, in particular the hardware and software carrier of the program APP, for example the configuration of the information processing system, the memory space available and/or required for the application APP, the values of the voltages at certain points of the information processing system, the user access code, and so forth.

Hence all the captions of tables, each corresponding to a well-defined information unit, are arranged in accordance with a grid pre-established in the observation memory MO in order to form the tables TE and TANT. It should be noted that the previous status tables TANT do not include all the captions providing in the table TE but are in general limited only to the captions for which a historical record is of some importance. The contents of these captions, or of some of them, may be read in a standardized in various service programs SER without either losing time or risking an addressing error.

Loading of the observation memory 38 is performed as follows:

The monitor circuit 36 associated with a sequencer records the contents of the output buffers of the pickups 32 and the output buffers of the processing circuit 34 for each observation cycle, and then proceeds to writing the recorded data into the table TE. Moreover, the monitoring circuit 36 updates the captions of the tables TANT. This operation is performed by two separate procedures, used as a function of the characteristics of the information contained in the caption in question:

a) in the case of information of a sequential or continuous character (such as a value measured by a pickup), updating of the captions in question is performed automatically by shifting upon each new observation cycle. For example, the order in which the new value of the caption "so" relating to a counter/chronometer is written will automatically trigger the prior transfer of the value contained in "so" to the caption "s−1" of the table TANT1, and so forth up to the table TANTN.
  b) in the case of information of a random nature, such as the end of execution of a predetermined function or command, the updating of the tables TANT will be performed only if a difference is detected between the new value to be used for the contents of the caption in question (for example, a caption of the FO field) and the current value of the contents of this caption.

In the course of each observation cycle and at the end of the updating phase, the tables TE and TANT are accessible for reading by the operating system OS and via the service programs SER through a suitable circuit of the monitoring module 40. Not all the crude information recorded by the pickups 32 is automatically entered into the observation memory 38. Some of this information is used as basic data by the processing means 38, which are capable of performing highly various functions as dictated by the interface designer (arithmetic, statistical, coding/decoding operations, logical interruptions, and so forth). The appropriate use of the processing means 34 makes it possible on the one hand to gain space in the observation memory and on the other to preprocess certain crude information in order to furnish them in a processed form that is more easily assimilated by the service programs SER.

It should be noted that recording of the information originating from the application program observed may be done on the one hand in a non-perturbing manner (since the observation interface is transparent between the user and his application APP), and on the other hand continuously without waiting for the occurrence of some perturbing event (thus the information the system or the user requires are always available in advance in their entirety). In a variant of the method according to the invention described here, automatic loading is done of an address table that is directly accessible from outside the program observed and includes the instantaneous addresses of blocks relating to the execution of the program observed, in particular for the code of the function being executed and the address of the contents of the instantaneous context associated with this function. This organization of the application program facilitates and accelerates the recording by the pickups 32 of the interface 30. The application can thus perform standardized self-interpretation of what is being processed and in what context.

To complete the description of the invention, one example of observation, via the observation interface according to the invention, of a modern office automation application, in this case a word processing program, will be described below. In this exemplary usage, the interface is associated with a service program comprising an expert system for self-training of the user for this application.

A frequent manipulation error made by non-professional word-processing users is an involuntary or uncontrolled activation of the "go to end of document" function. The result is an empty screen, which confuses the user and leads him to call up the expert self-training system.

As soon as it is activated, the expert system proceeds to read the captions of the observation memory MO that it needs in order to perform its diagnosis and explain the disappearance of the test from the screen to the user. The captions read are in particular those corresponding to the following:

the last function executed ("go to end of document");
  the status of the central system and of the information processing carrier, for example at the level of clocks and voltages (which shows that the information processing system is operational);
  the general status of execution of the application (absence of an operational error indication, such as "cannot read file" or "insufficient memory capacity").

The processing of this information read in the observation interface enables the expert system to conclude that the "go to end of document" instruction was activated unintentionally and to explain by an on-screen message that the user has shifted his text downward and in so doing has reached the end of the document.

In the case where the user wishes to return to the previous status, the expert system searches in the observation memory for the last data keyed before the error occurred, for example "ABCD", and uses them to reposition the cursor in its previous position. In the case of multiple solutions (where a text is repeated), the expert system proposes the various options to the user.

In general, with the method for observation of the execution of a program according to the invention, and with the apparatus according to the invention for performing it, the expert self-training system is capable of analyzing the most frequently used functions, functions used in place of others, data that are written properly or improperly, and possibly giving instructions to the application (repositioning of the cursor, commands for executing functions for demonstration purposes, etc.), with the monitoring module in the latter case operating in the writing mode.

Highly advantageously, the invention is also usable with an expert system of the diagnostic aid type and for troubleshooting in the system, in particular in the case of participative maintenance. Once again, the diagnostic expert system proceeds at the rate needed by it, to read in the observation memory information on the global status of the system and its historical record. To do so, it is often opportune to have the monitoring module 40 working in the writing mode in the operating system 25 and/or in the application, and to send information and/or command instructions to be executed (for example, function test commands). Observation by the interface 30 of the conditions of execution of these commands makes it possible to perform rapid and precise diagnosis of the incident. This makes it possible to use the monitoring module 40 in the writing mode to send the instruction for returning the information processing system to the operational status.

Finally, it should be noted that the information available in the tables of the memory 38 is located at well-defined addresses and is equally accessible to various expert systems or to the operating system, or to other service programs.

What is claimed is:

1. A method of observation of the execution of a program loaded into an information processing system of the type including the following minimal configuration: a central processing unit, a central memory, one or more input and/or output peripherals exchanging data with the central processing unit, an operating system, optionally one or more application programs, and a service program external to the application program for accessing an observation memory particularly in a reading mode comprising:

recording instantaneous information units relating to program being executed and/or the information processing operation context of said program at predetermined points of the information processing system;

optionally processing certain of said information units processed by pre-established analysis procedures;

memorizing in a status table (TE) and in accordance with a pre-established grid, a selection of, processed and/or unprocessed, information units corresponding to the observed program being executed;

authorizing access to the status table (TE), particularly in the reading mode, for service programs (SER) external to the observed program being executed, retaining all or part of the status tables (TE) corresponding to observation cycles preceding the current cycle in memory in accordance with a structure of previous chronologically arranged status tables (TANT1–TANTN), and beginning with the observed application program, automatically loading an address table directly accessible from outside the application program, including the instantaneous addresses of blocks of information relating to the execution of the observed program, in particular an address of a code of a function being executed and an address of the contents of an instantaneous context associated with the function.

2. The method as defined by claim 1, characterized in that the status table (TE) is associated with a chronological benchmark with respect to the observed programs being executed, and further including the step of maintaining the contents of the status table (TE) for a period of time equal at least to a predetermined duration known as the current observation cycle; and automatically updating all or part of the status table by successive recording operations upon each new observation cycle.

3. The method as defined by claim 1, including loading the tables (TANT1–TANTN) automatically by shifting upon each new observation cycle.

4. The method as defined by claim 1 including structuring the status table (TE) on the basis of principal fields.

5. The method as defined by claim 4, wherein the status table (TE) includes at least one principal field selected from among the following fields:

functions (FO): defined by a list of the last functions executed by the program and functions being executed or planned to be executed, and their context;

central system (SC): defined by a status of certain stacks, registers and memory zones of the central processing unit and central memory;

input (EN): defined by last data received from the input peripherals with their context;

output (SO): defined by the last data outputted to the output peripherals with their context;

chrono (CH): defined by informations and/or analyses involving a time function;

support (SU): defined by informations relating to hardware and software support of the program observed.

6. The method as defined by claim 5, characterized in that said method is performed at the level of the operating system of the information processing system in a transparent fashion for the observed program.

7. The method as defined by claim 5, characterized in that in the application program, a service zone operating in a reading and/or a writing mode is organized on the basis of service programs (SER) that are external to the application observed, to permit input and output of information or instruction application programs relating to the application program observed and/or its information processing operating context.

8. The method as defined by claim 5 including updating of the tables (TANT1–TANTN) only if a difference is detected between a new value to be used for the content of a caption of a field and a current value in said caption of a field.

9. The method as defined by claim 5 wherein said function comprises either function parameters, addresses for return to the program, associated interruptions, or a combination thereof.

10. The method as defined by claim 5 wherein said input comprises either an error test, a validity test, or a combination thereof.

11. The method as defined by claim 5 wherein the informations or analyses involving a time function comprises either an execution speed information, a transfer speed information, a synchronicity analyses, or a combination thereof.

12. The method as defined by claim 5 wherein the informations relating to the hardware and software support comprises either the configuration of the information processing system, the memory space available and/or required by the application program, the values of the voltages at certain points of the information processing system, the user access code, or a combination thereof.

13. An apparatus for performing the method of observation of a program loaded into an information processing system having at least a central processing unit (10), a central memory (12), input an/or output peripherals (22) exchanging data with the central processing unit, an operating system (OS) and at least one application program (APP) being executed, a service program external to the application program for accessing an observation memory, said apparatus being characterized in that it further includes an observation interface (30) having:

first pickups means (32) for picking up instantaneous information, said first means being operatively associated with the central memory (12) and input and/or output peripherals (22);

second means (34) connected to said first means for processing the instantaneous information;

third means 38 comprising a monitor circuit (36) and an observation memory (38) connected to said second means for memorizing the instantaneous information, before or after processing, and fourth means (40) constituted by a monitoring module in said observation memory (38) connected to said third means for reading said memorized informations that are accessible from outside the application program which is observed and executed, said fourth means including means for communicating bidirectionally with the operating system (OS) and the service program, wherein said apparatus retains all or part of status tables (TE) corresponding to observation cycles preceding the current cycle in memory in accordance with a structure of previous chronologically arranged status tables (TANT1–TANTN).

14. The apparatus as defined by claim 13, characterized in that said means acting as pickups (32) are in the form of a central memory reader and/or keyboard filter and/or screen memory reader and/or mouse reader and/or buffer memory reader of a printer and/or modem.

15. The apparatus as defined by claim 13, wherein said fourth means further includes means for reading and/or writing in said observed application program, which means are accessible from outside the apparatus, wherein said apparatus is operable to collect information on the application program which is observed for use by the service program.

16. A method of observation of the execution of a program loaded into an information processing system of the type including the following minimal configuration: a central processing unit, a central memory, one or more input and/or output peripherals exchanging data with the central processing unit, an operating system, operationally one or more application programs, and a service program external to the application program for accessing an observation memory particularly in a reading mode comprising:

recording instantaneous information units relating to program being executed and/or the information processing operation context of said program at predetermined points of the information processing system;

optionally processing certain of said information units processed by pre-established analysis procedures;

memorizing in a status table (TE) and in accordance with a pre-established grid, a selection of, processed and/or unprocessed, information units;

authorizing access to the status table (TE), particularly in the reading mode, for service programs (SER) external to the observed program being executed;

retaining all or part of the status table (TE) corresponding to observation cycles preceding the current cycle in memory in accordance with a structure of previous chronologically arranged status tables (TANT1–TANTN); and including updating the tables (TANT1–TANTN) only if a difference is detected between a new value to be used for the content of a caption of a field thereof and a current value in said caption of a field.

17. A method of observation of the execution of a program loaded into an information processing system of the type including the following minimal configuration: a central processing unit, a central memory, one or more input and/or output peripherals exchanging data with the central processing unit, an operating system, operationally one or more application programs, and a service program external to the application program for accessing an observation memory particularly in a reading mode comprising:

recording instantaneous information units relating to program being executed and/or the information processing operation context of said program at predetermined points of the information processing system;

optionally processing certain of said information units processed by pre-established analysis procedures;

memorizing in a status table (TE) and in accordance with a pre-established grid, a selection of, processed and/or unprocessed, information units;

authorizing access to the status table (TE), particularly in the reading mode, for service programs (SER) external to the observed program being executed;

retaining all or part of the status table (TE) corresponding to observation cycles preceding the current cycle in memory in accordance with a structure of previous chronologically arranged status tables (TANT1–TANTN); and providing in said status table a function field which comprises either function parameters, addresses for return to the program, associated interruptions, or a combination thereof.

18. A method of observation of the execution of a program loaded into an information processing system of the type including the following minimal configuration: a central processing unit, a central memory, one or more input and/or output peripherals exchanging data with the central processing unit, an operating system, operationally one or more application programs, and a service program external to the application program for accessing an observation memory particularly in a reading mode comprising:

recording instantaneous information units relating to program being executed and/or the information processing operation context of said program at predetermined points of the information processing system;

optionally processing certain of said information units processed by pre-established analysis procedures;

memorizing in a status table (TE) and in accordance with a pre-established grid, a selection of, processed and/or unprocessed, information units;

authorizing access to the status table (TE), particularly in the reading mode, for service programs (SER) external to the observed program being executed;

retaining all or part of the status table (TE) corresponding to observation cycles preceding the current cycle in memory in accordance with a structure of previous chronologically arranged status tables (TANT1–TANTN); and providing in said status table an input field which comprises either an error test, a validity test, or a combination thereof.

19. A method of observation of the execution of a program loaded into an information processing system of the type including the following minimal configuration: a central processing unit, a central memory, one or more input and/or output peripherals exchanging data with the central processing unit, an operating system, operationally one or more application programs, and a service program external to the application program for accessing an observation memory particularly in a reading mode comprising:

recording instantaneous information units relating to program being executed and/or the information processing operation context of said program at predetermined points of the information processing system;

optionally processing certain of said information units processed by pre-established analysis procedures;

memorizing in a status table (TE) and in accordance with a pre-established grid, a selection of, processed and/or unprocessed, information units;

authorizing access to the status table (TE), particularly in the reading mode, for service programs (SER) external to the observed program being executed;

retaining all or part of the status table (TE) corresponding to observation cycles preceding the current cycle in memory in accordance with a structure of previous chronologically arranged status tables (TANT1–TANTN); and providing in said status table a field for informations or analyses involving a time function which includes either an execution speed information, a transfer speed information, a synchronicity analyses, or a combination thereof.

20. A method of observation of the execution of a program loaded into an information processing system of the type including the following minimal configuration: a central processing unit, a central memory, one or more input and/or output peripherals exchanging data with the central processing unit, an operating system, operationally one or more application programs, and a service program external to the application program for accessing an observation memory particularly in a reading mode comprising:

recording instantaneous information units relating to program being executed and/or the information processing operation context of said program at predetermined points of the information processing system;

optionally processing certain of said information units processed by pre-established analysis procedures;

memorizing in a status table (TE) and in accordance with a pre-established grid, a selection of, processed and/or unprocessed, information units;

authorizing access to the status table (TE), particularly in the reading mode, for service programs (SER) external to the observed program being executed;

retaining all or part of the status table (TE) corresponding to observation cycles preceding the current cycle in memory in accordance with a structure of previous chronologically arranged status tables (TANT1–TANTN); and providing in said status table a field for information relating to hardware and software support which includes either the configuration of the information processing system, the memorys pace available and/or required by the application program, the values of the voltages at certain points of the information processing system, the user access code, or a combination thereof.

21. An apparatus for performing the method of observation of a program loaded into an information processing system having at least a central processing unit (10), a central memory (12), input an/or output peripherals (22) exchanging data with the central processing unit, an operating system (OS) and at least one observed application program (APP) being executed, a service program external to the application program for accessing an observation memory, said observation memory configured for automatically loading an address table directly accessible from outside the observed application program, including the instantaneous addresses of blocks of information relating to the execution of the observed application program, in particular an address of a code of a function being executed and an address of the contents of an instantaneous context associated with the function being executed and an address of the contents of an instantaneous context associated with the function, said apparatus being characterized in that it further includes an observation interface (30) having:

first pickups means (32) for picking up instantaneous information, said first means being operatively associated with the central memory (12) and input and/or output peripherals (22);

second means (34) connected to said first means for processing the instantaneous information;

third means 38 comprising a monitor circuit (36) and an observation memory (38) connected to said second means for memorizing the instantaneous information, before or after processing, fourth means (40) constituted by a monitoring module in said observation memory (38) connected to said third means for reading said memorized informations that are accessible from outside the application program which is observed and executed, said fourth means including means for communicating bidirectionally with the operating system (OS) and the service program, and an address of a code of a function being executed and an address of the contents of an instantaneous context associated with the function wherein said apparatus retains all or part of status tables (TE) corresponding to observation cycles preceding the current cycle in memory in accordance with a structure of previous chronologically arranged status tables (TANT1–TANTN).

22. The apparatus as defined by claim 21, characterized in that said means acting as pickups (32) are in the form of a central memory reader and/or keyboard filter and/or screen memory reader and/or mouse reader and/or buffer memory reader of a printer and/or modem.

23. The apparatus as defined by claim 21, wherein said fourth means further includes means for reading and/or writing in said observed application program, which means are accessible from outside the apparatus, wherein said apparatus is operable to collect information on the application program which is observed for use by the service program.

24. An apparatus for performing the method of observation of a program loaded into an information processing system having at least a central processing unit (10), a central memory (12), input an/or output peripherals (22) exchanging data with the central processing unit, an operating system (OS) and at least one observed application program (APP) being executed, a service program external to the application program for accessing an observation memory, said observation memory configured for automatically loading an address table directly accessible from outside the observed application program, including the instantaneous addresses of blocks of information relating to the execution of the observed application program, in particular an address of a code of a function being executed and an address of the contents of an instantaneous context associated with the function being executed and an address of the contents of an instantaneous context associated with the function, said apparatus being characterized in that it further includes an observation interface (30) having:

first pickups means (32) for picking up instantaneous information, said first means being operatively associated with the central memory (12) and input and/or output peripherals (22);

second means (34) connected to said first means for processing the instantaneous information;

third means 38 comprising a monitor circuit (36) and an observation memory (38) connected to said second means for memorizing the instantaneous information, before or after processing, fourth means (40) constituted by a monitoring module in said observation memory (38) connected to said third means for reading said memorized informations that are accessible from outside the application program which is observed and executed, said fourth means including means for communicating bidirectionally with the operating system (OS) and the service program, an address of a code of a function being executed and an address of the contents of an instantaneous context associated with the function wherein said apparatus retains all or part of status tables (TE) corresponding to observation cycles preceding the current cycle in memory in accordance with a structure of previous chronologically arranged status tables (TANT1–TANTN), and said status table including a field for information or analyses involving a time function which includes either an execution speed information, transfer speed information, and synchronicity analysis or combination thereof.

25. The apparatus as defined by claim 24, characterized in that said means acting as pickups (32) are in the form of a central memory reader and/or keyboard filter and/or screen memory reader and/or mouse reader and/or buffer memory reader of a printer and/or modem.

26. The apparatus as defined by claim 24, wherein said fourth means further includes means for reading and/or writing in said observed application program, which means are accessible from outside the apparatus, wherein said apparatus is operable to collect information on the application program which is observed for use by the service program.

* * * * *

UNITED STATES PATENT AND TRADEMARK OFFICE
CERTIFICATE OF CORRECTION

PATENT NO.  : 6,151,687
DATED       : November 21, 2000
INVENTOR(S) : Claes, Gerard It is certified that error appears in the above-identified patent and that said Letters Patent is hereby corrected as shown below:

Column 11,
Line 33, delete "memorys pace" and replace with -- memory space --;

Signed and Sealed this

Twenty-fifth Day of June, 2002

Attest:

Attesting Officer

JAMES E. ROGAN
Director of the United States Patent and Trademark Office